US012123949B2

(12) United States Patent
Kapusta

(10) Patent No.: US 12,123,949 B2
(45) Date of Patent: Oct. 22, 2024

(54) LIDAR REFERENCE WAVEFORM WITH INCREASED SAMPLE RATE

(71) Applicant: Analog Devices, Inc., Wilmington, MA (US)

(72) Inventor: Ronald A. Kapusta, Carlisle, MA (US)

(73) Assignee: Analog Devices, Inc., Wilmington, MA (US)

(*) Notice: Subject to any disclaimer, the term of this patent is extended or adjusted under 35 U.S.C. 154(b) by 979 days.

(21) Appl. No.: 17/125,000

(22) Filed: Dec. 17, 2020

(65) Prior Publication Data

US 2022/0196838 A1    Jun. 23, 2022

(51) Int. Cl.
*G01S 17/89*     (2020.01)
*G01S 7/484*     (2006.01)
*G01S 7/4861*    (2020.01)
*G01S 17/04*     (2020.01)

(52) U.S. Cl.
CPC .............. *G01S 17/89* (2013.01); *G01S 7/484* (2013.01); *G01S 7/4861* (2013.01); *G01S 17/04* (2020.01)

(58) Field of Classification Search
None
See application file for complete search history.

(56) References Cited

U.S. PATENT DOCUMENTS

| | | | |
|---|---|---|---|
| 8,310,655 B2 | 11/2012 | Mimeault | |
| 11,169,246 B1 * | 11/2021 | Viswanatha | G01S 7/497 |
| 2018/0113160 A1 * | 4/2018 | Warburton | G01S 17/10 |
| 2020/0041651 A1 * | 2/2020 | Kapusta | G01S 17/42 |

FOREIGN PATENT DOCUMENTS

WO    2018081166    5/2018

OTHER PUBLICATIONS

"European Application Serial No. 21211604.0, Extended European Search Report mailed May 19, 2022", 10 pgs.
"European Application Serial No. 21211604.0, Response filed Dec. 6, 2022 to Extended European Search Report mailed May 19, 2022", 28 pgs.
"European Application Serial No. 21211604.0, Communication Pursuant to Article 94(3) EPC mailed Nov. 14, 2023", 6 pgs.
"European Application Serial No. 21211604.0, Response filed Feb. 19, 24 to Communication Pursuant to Article 94(3) EPC mailed Nov. 14, 2023", 19 pgs.

* cited by examiner

*Primary Examiner* — Luke D Ratcliffe
(74) *Attorney, Agent, or Firm* — Schwegman Lundberg & Woessner, P.A.

(57) ABSTRACT

A method for determining, in an optical detection system, a distance to a target region includes obtaining first and second light pulses from a signal generator within the optical detection system and obtaining samples of the respective first and second light pulses, where the samples having a first temporal resolution. The method also includes generating a reference waveform having a second temporal resolution by combining the samples of the respective first and second light pulses, where the second temporal resolution being higher than the first temporal resolution. The method further includes obtaining a reflection of a third light pulse from the target region and determining an arrival time of the reflection of the third light pulse using the reference waveform.

24 Claims, 5 Drawing Sheets

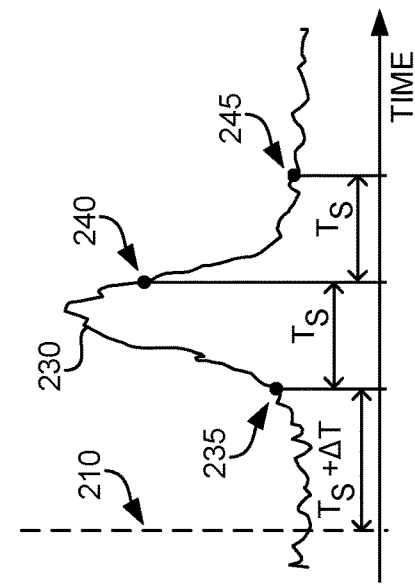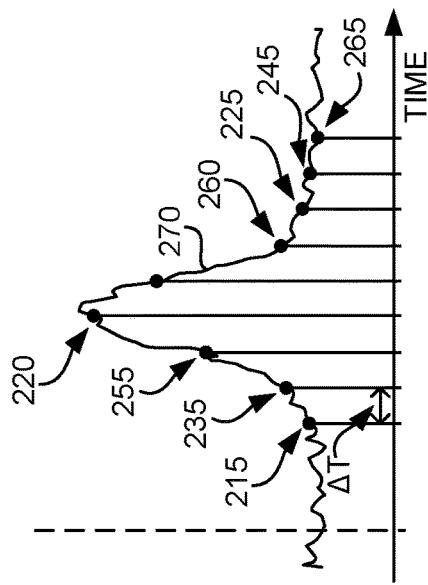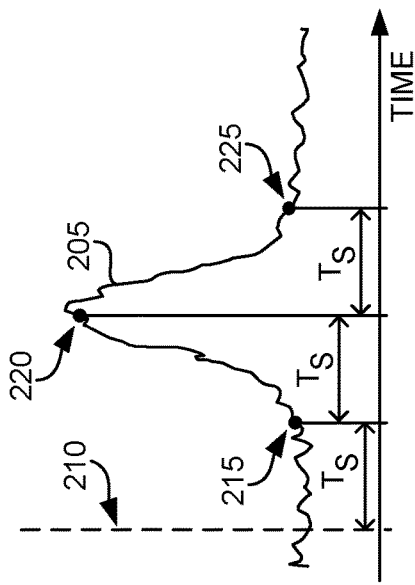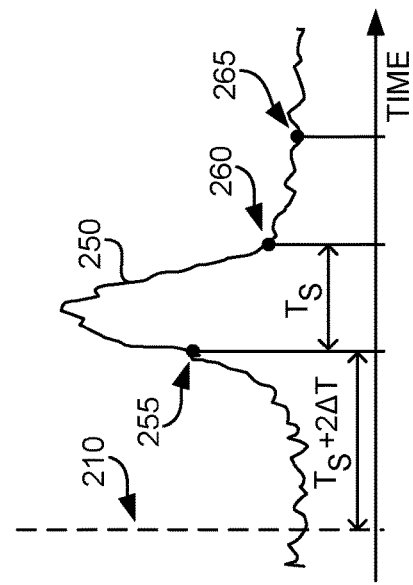

LIDAR REFERENCE WAVEFORM WITH INCREASED SAMPLE RATE

FIELD OF THE DISCLOSURE

This document pertains generally, but not by way of limitation, to improving accuracy in a LIDAR system.

BACKGROUND

Certain laser range finding systems are based on a time-of-flight measurement, such as in systems where an absolute time between a transmitted signal and a received signal is measured and used to determine a distance to a target object or region of interest (hereinafter, "target region"). In an example, pulsed LIDAR systems calculate the distance to a target region by transmitting a series of light pulses towards the target region and determining the time-of-flight of reflected pulses. Determining the time-of-flight of a reflected pulse can include digitizing an entire waveform comprising noise and the returned pulse and performing echo detection operations using the digitized waveform to identify the returned pulse within the noise. The determined time-of-flight of the pulse is then used to determine a distance from the LIDAR system to the target region.

SUMMARY OF THE DISCLOSURE

A method for determining, in an optical detection system, a distance to a target region can include obtaining first and second light pulses from a signal generator within the optical detection system and obtaining samples of the respective first and second light pulses, where the samples having a first temporal resolution. The method can also include generating a reference waveform having a second temporal resolution by combining the samples of the respective first and second light pulses, where the second temporal resolution being higher than the first temporal resolution. The method can further include obtaining a reflection of a third light pulse from the target region and determining an arrival time of the reflection of the third light pulse using the reference waveform.

A method for determining, in an optical detection system, a distance to a target region, can include obtaining first and second light pulses from an optical transmitter and providing, to a first detector within the optical detection system, the first and second light pulses. The method can also include adjusting a sample time of the second light pulse to create a time delay between capturing a sample of the first light pulse and capturing a sample of the second light pulse at the first detector and capturing samples of the respective first and second light pulses at the first detector based upon the adjusted sample time. The method can further include obtaining a temporal profile of the captured samples, transmitting a third light pulse to the target region, and receiving, at a second detector, a reflection from the target region of the transmitted third pulse. The method can additionally include determining an arrival time of the received reflection based on the temporal profile.

An optical range finding system to determine a distance to a target region can include a transmitter circuit to generate first and second light pulses, a first optical detector circuit to convert the first and second light pulses to respective first and second electrical signals, and a sampling circuit, coupled to the first optical detector, to obtain samples of an electrical signal. The system can also include a modulation circuit, coupled to the sampling circuit, to actuate the sampling circuit to obtain first samples of the first electrical signal according to a first sampling trigger and to obtain second samples of the second electrical signal according to a second sampling trigger, where the first sampling trigger is temporally offset from the second sampling trigger by a timing delay corresponding to a fraction of a sampling period of the first detector. The system can further include a synthesizer circuit to obtain a reference waveform having a higher resolution than a sampling resolution of the first detector circuit by interleaving the first and second samples to generate the reference waveform. The system can additionally include a signal detector circuit to determine an arrival time of a reflection from the target region of a third light pulse based on the reference waveform.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 2A-2D illustrate diagrams of electrical pulses that are sampled to generate a reference waveform.

DETAILED DESCRIPTION

Figure 1:
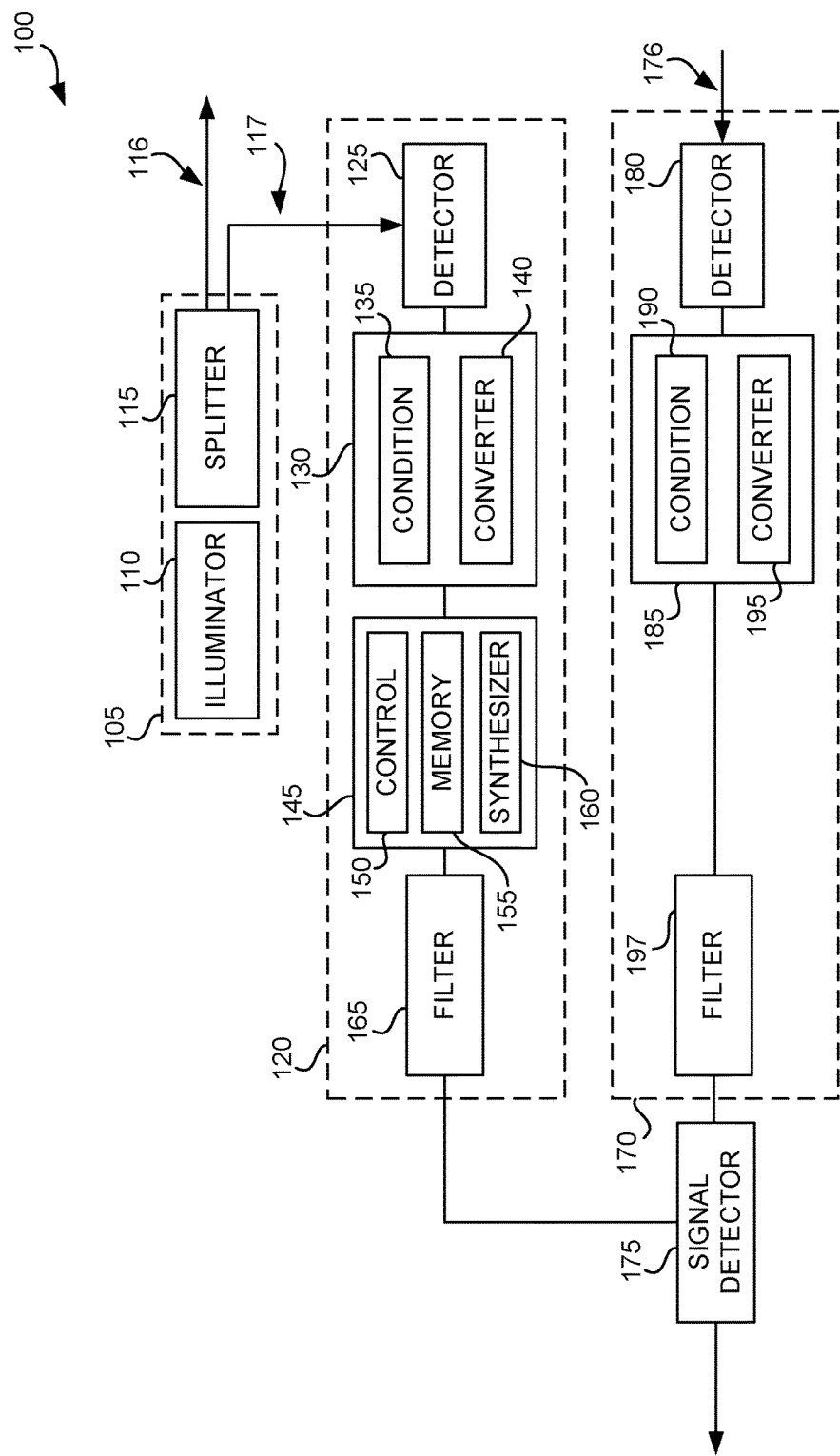
FIG. 1 illustrates an example of a LIDAR system that uses a reference waveform to determine time-of-flight of a signal.

The present disclosure includes techniques to improve the timing or distance measurement resolution of a LIDAR system without requiring improvements to analog-to-digital converters (ADC) used in such systems. Such improvements are obtained by synthesizing a high sample-rate reference waveform using a low-sample rate ADC for use with a matched filter for determining time-of-flight of a signal transmitted to a target region. These techniques can reduce the cost of LIDAR systems by enabling high resolution time-of-flight or distance measurements in systems that use low-speed, or low sample rate, ADC circuits.

In optical ranging systems such as LIDAR, the time-of-flight principle is used to measure distance. The time-of-flight principle states that the roundtrip travel time of a pulse of light is equal to 2*dc, where d is the distance to the target and c is the speed of light. Consequently, the minimum resolvable distance $\Delta d$ is related to the minimum resolvable time difference $\Delta T$ by that same relationship, $\Delta d = c*\Delta T/2$. For this reason, LIDAR systems typically rely on high-sample rate ADCs in a receive signal chain, as the sample rate of the ADC determines the minimum resolvable time difference. As an example, a 1 gigasample per second (GS/s) ADC samples at 1 nanosecond (ns) intervals. If the 1 ns time interval were the same as the minimum resolvable time difference, as would be the case in a conventional LIDAR system, the corresponding resolvable distance would be Δd=15 cm. It would be desirable, in terms of cost, power, and complexity, to use an ADC with a lower sample rate while maintaining comparable or better distance resolution. Equivalently, it would be desirable for a LIDAR system to be constructed such that the minimum resolvable time difference was less than the sampling interval of the ADC.

LIDAR systems can use matched filters to detect a LIDAR signal in a noisy waveform that is reflected from a target region. In an example, a reference waveform can be convolved with a noisy waveform that is reflected from a target region (hereinafter, "reflected waveform") to identify a point, or an area, of maximum overlap between the reference waveform and the reflected waveform. The identified point of overlap can be used to determine the time of flight of the transmitted LIDAR signal and by, extension, a distance measurement from the LIDAR system to the target region, such as described in US Pat. Pub. US 2020-0041651 A1 to Kapusta et. al., which is titled "System and Method for Improving Range Resolution in a Lidar System" and included in its entirety by reference. The accuracy or resolution of the distance measurement can depend on the temporal resolution to which the point of maximum overlap between the reference waveform and the reflected waveform is determined. The temporal resolution to which the point of maximum overlap between the reference waveform and reflected waveform is determined can depend on the temporal resolution of the reference waveform or the temporal resolution of the reflected waveform. One technique for improving the resolution of the reference waveform or the resolution of the detected reflected signal, and by extension the resolution of the distance measurement, is to use higher speed detection or sampling circuits, such as high sample rate analog to digital converters, to digitize reference LIDAR pulses used to obtain the reference waveform or to digitize the reflected waveform. Such techniques, however, can increase the cost or power consumption of a LIDAR system.

Examples of the present disclosure are based on the recognition that, for a LIDAR system that is configured with a reference channel having a sampling circuit, such as an ADC, with a specified sample rate, a reference waveform can be synthesized that has a resolution that is greater than the sampling rate of the sampling circuit. Such reference waveform can be generated by obtaining two or more sets of digital samples of optical pulses generated by the LIDAR system, wherein each set of digital samples correspond to a LIDAR pulse generated by the system and is obtained by varying or adjusting the sample time or sample trigger for actuating the sampling circuit to obtain the digital samples relative to the sample time or sample trigger used to obtain digital samples of another LIDAR pulse. The sets of digital samples can then be combined, such as by interleaving samples of different pulses, and processed to obtain the reference waveform having sample data points between in between the nominal sample periods of the sampling circuit. In an example, the sample times or sample triggers are varied or adjusted by delaying one sample time relative to another sample time by a fraction of a sample period of the sampling circuit. In an example, adjusting the sample time for obtaining digital samples of a first LIDAR pulse includes adjusting the time at which the sampling circuit is actuated to begin capturing the digital samples, such as by delaying a trigger or clock signal that initiates the sampling. The timing adjustments and sampling operations can be repeated for one or more LIDAR pulses, such as by applying a different timing delay to the sample time of each pulse, and the resulting digital samples can be combined to synthesize the reference waveform having increased temporal resolution (e.g., a decreased time or temporal distance between sample data points).

As used herein, a sample time is a time relative to a reference signal or clock at which a sampling circuit is actuated to obtain a set of one or more digital samples of an electrical signal. In an example, a first sample time for obtaining a first set of digital samples is a time relative to a first pulse of reference signal or reference clock, while a second sample time for obtaining a second set of digital samples is a time relative to a second pulse of the reference signal or reference clock.

FIG. 1 illustrates an example of a LIDAR system 100 that uses a reference waveform to determine time-of-flight of a signal, such as an electromagnetic or optical pulse (herein after, "light pulse" or "LIDAR pulse") transmitted by the LIDAR system. In an example, the LIDAR system 100 is a scanning LIDAR system that is configured to incrementally generate an image of an target region within the field of view of the LIDAR system by transmitting a series of LIDAR pulses towards the target region and determining the time-of-flight for reflected LIDAR pulses. The LIDAR system 100 can include a transmitter circuit 105, a reference circuit 120, and receiver circuit 170. In another example, the LIDAR system 100 is a flash LIDAR system that generates an image of a portion of or the entire field of view without scanning the transmitted light. As a flash system, the receiver circuit 170 could be replicated multiple times, each processing a portion of the reflected LIDAR pulses.

The transmitter circuit 105 includes a circuit that is configured to generate or transmit one or more LIDAR pulses, such as towards a target region, to determine a set of one or more distances to the target region. In an example, the transmitter circuit includes an illuminator 110 and a splitter 115. The illuminator 110 can include any suitable light emitting device, such as a laser or a light emitting diode. In an example, the illuminator 110 is configured to generate a coherent light beam, such as a laser pulse, including light of an indicated frequency or set of frequencies. The splitter 115 can include any device that is configured direct LIDAR pulses generated by the illuminator 110 to a first aperture (not shown) of the LIDAR system 100, such for transmission to a target region. The splitter 115 can also be configured to direct LIDAR pulses 117, or a portion of the LIDAR pulses, to a detector 125 in the reference circuit 120. In an example, the splitter 115 includes a lens, prism, an optical waveguide, or a mirror. In one example, the splitter 115 is not an explicit component of the transmitter circuit 105. In this example, LIDAR pulses 117 are stray or parasitic light scattered from a transmitted LIDAR pulse by other components in the transmitter 105. In a scanning LIDAR system, transmitter circuit 105 may also include an optical steering element such as a mirror, MEMS mirror, spinning reflective polygon, optical phased array, liquid crystal beam steerer, or another steering element.

The reference circuit 120 includes a circuit that is configured to synthesize or generate a reference waveform according the techniques described herein. In an example, the reference circuit 120 includes a detector 125, a sampling circuit 130, a reference waveform generator 145, and a filter 165. The detector 125 includes a circuit that is configured to detect or capture an optical pulse, such as LIDAR pulses directed to the reference circuit 120 by the splitter 115, and generate an electrical signal (e.g., a time varying voltage, current, or frequency) that is indicative of the detected optical pulse. In an example, the detector 125 includes a photodiode, an avalanche photodiode (APD), a phototransistor, a single photon detector, or any other suitable photosensitive device.

The sampling circuit 130 includes a circuit, or a signal chain including one or more circuits, that is configured to generate a digital representation of the electrical signal generated by the detector 125 (e.g., electrical signal that is representative of the detected optical pulse). The digital representation of the electrical signal can include a discrete voltage or a sequence of one or more digital values that is indicative of an electrical characteristic or the electrical signal. In an example, the sampling circuit 130 generates a set of discrete voltages that are indicative of a binary or binary coded decimal representation of the magnitude of a voltage or current that corresponds to an optical pulse detected by detector 125. In another example, the sampling circuit 130 generates a set of discrete electrical pulses that are indicative of a binary or binary coded decimal representation of a frequency of the optical pulse detected by detector 125. In another example, the sampling circuit 130 generates a set of discrete electrical pulses that are indicative of a binary or binary coded decimal representation of a time at which the optical pulse was detected by detector 125.

The sampling circuit 130 can include a conditioning circuit 135 and a converter circuit 140. The conditioning circuit 135 includes a circuit that is configured to convert a first electrical signal, such as an input reference signal, generated by the detector circuit 125 to a second electrical signal, such as a conditioned reference signal, that satisfies one or more input signal condition requirements for the converter circuit 140. In an example, the conditioning circuit 135 is a transimpedance amplifier (TIA) that configured to convert an input reference signal comprising an electrical current that is indicative of an optical pulse detected by the detector 125 into a conditioned reference signal that includes an electrical voltage that corresponds to, or that is generated using, the electrical current.

The converter circuit 140 includes a circuit that is configured to digitize an electrical signal, such as an analog conditioned reference signal generated by the conditioning circuit 135. In an example, the converter circuit 140 includes a low sample-rate ADC, such as an ADC have a sampling rate of less than 500 million samples per second (MSPS). Such an ADC would be considered low-sample rate for a LIDAR system achieving 15 centimeter (cm) distance resolution or better, as conventionally this would correspond to the use of a 1 GS/s ADC. The converter circuit 140 can be configured to capture or digitize a sample of the conditioned reference signal based on timing indicated by a clock or other trigger signal. In an example, the converter circuit 140 is configured to periodically capture or digitize a sample of the conditioned reference signal at a time relative to a rising or falling edge of a clock or trigger signal. In an example, the system 100 causes or actuates the converter circuit 140 to capture or digitize a sample of the conditioned reference signal by actuating a control signal of the converter circuit responsive to, or using, the clock or trigger signal. The clock or trigger signal can be generated based on one or more timing parameters or timing circuits of the LIDAR system 100. In an example, the clock or trigger signal is generated, or configured, to cause the converter circuit to sample or digitize the conditioned reference signal in coordination with transmission of the one or more LIDAR pulses towards the target region, such as by causing the converter circuit to initiate or execute a sequence of sampling operations at a specified time relative to the transmission of the LIDAR pulses.

In some embodiments, the detector circuit 125 and sampling circuit 130 may be combined into a single circuit, for example a digital-output sensor. As some examples, the digital-output sensor could be a CMOS image sensor, Silicon-photomultiplier, or single-photon avalanche diode (SPAD) sensor.

The reference waveform generator 145 includes one or more circuits that are configured to generate or synthesize a reference waveform (e.g., a synthesized reference waveform) based on LIDAR pulses detected by the detector circuit 125. In an example, the reference waveform generator 145 receives a set of one or more digital samples from the sampling circuit 130 and generates a reference waveform by using interpolation, interleaving, or other suitable techniques to extrapolate points on the synthesized waveform between the digital samples. An output of the reference waveform generator 145 can include data that is indicative of a reference waveform that is indicative of a temporal profile of the optical pulses detected by detector 125. In an example, a temporal profile of an optical pulse includes a time varying representation of the optical pulse, such as a waveform or a sequence of sample data points that represents current or voltage amplitude as a function of time. The fidelity or resolution of the reference waveform can be determined based on the temporal or time-based distance between adjacent digital samples in the set of one or one or more digital samples, such that shorter temporal distance between the digital samples produces higher fidelity reference waveforms that correspond to improved distance resolution when used in a time-of-flight calculation.

The reference waveform generator 145 includes a control circuit 150, a memory 155, and a synthesizer 160. The control circuit 150 can be configured to control the operation of one or more components of the waveform generator 145, such as to obtain digital samples from the sampling circuit 130, to store the obtained samples in the memory 155, or to actuate the synthesizer 160 to generate one or more reference waveforms using the stored digital samples. The control circuit 150 can also be configured to generate or adjust a clock or trigger signal that is used by the sampling circuit 130 and the transmitter 105 relative to each other, initiating a transmitted pulse and a set of sampling operations to generate digital samples of a signal, such as a conditioned reference signal. Generating or adjusting the clock or trigger signal can include delaying or offsetting the clock or trigger signal by a fraction of the sampling period of the sampling circuit 130 or of an ADC associated with the sampling circuit. In an example, the control circuit 150 is configured to generate a first clock or trigger signal (e.g., a reference trigger) to cause the sampling circuit 130 to generate a first set of digital samples that are each spaced an integral number of sampling periods from the first clock or trigger signal. The control circuit 150 can be further configured to generate a second clock or trigger signal with a first delay, such as a delay that is one-seventh of the sampling period of the sampling circuit 130 determined relative to the first clock or trigger signal, such as to cause the sampling circuit 130 to generate a second set of digital samples that are each spaced an integral number of sampling periods from the second clock or trigger signal. Such second set of digital samples are delayed or offset relative to the first set of digital samples by the first delay. In an example, the first set of digital samples are obtained from a first optical pulse detected at the detector 125 and the second set of digital samples are obtained by sampling a second optical pulse detected at the detector.

The synthesizer circuit 160 is configured to obtain, such as from the memory 155, two or more sets of digital samples, such as a first set of digital samples and a second set of digital samples that includes samples that are delayed relative to corresponding samples in the first set of digital samples, and to combine that samples to generate a synthesized waveform having a higher temporal resolution than the sampling circuit 130. In an example, the synthesizer circuit 160 can obtain seven sets of digital samples, where each set is delayed by a distinct time $k\Delta T$, where k is an integer between 0 and 6, and $\Delta T$ is a span of time corresponding to one-seventh of the sampling period of the sampling circuit 130. The synthesizer circuit 160 can combine the seven sample sets to generate an aggregate sample set. The aggregate sample set can then be used to synthesize a waveform having a resolution that is seven times higher than the resolution sampling circuit that generated sets of digital samples. In another example, the synthesizer 160 is process implemented by a one or more circuits, such as a microprocessor. Such process includes storing the sets of digital samples in the memory 155 and sequentially retrieving an interleaved subset of the stored samples, where digital samples in the interleaved subset are interleaved based on their sample times. In an example, the sets of digital samples are interleaved and stored in the memory 155. In another example, the sets of digital samples are interleaved after being stored in the memory 155, such as according to a memory access operation that performs interleaved memory reads.

The filter 165 includes a circuit, such as a low pass filter, that is configured to filter or remove noise from a reference waveform, such as the reference waveform generated by waveform generator 145. In an example, the filter 165 includes an averaging filter that is configured to obtain or receive two reference waveforms, and to combine, such as though averaging, the waveforms generate a reference waveform with reduced noise. In another example, the filter 165 includes a process for filtering or reducing noise by averaging or weighting two or more sets of digital samples. In one example, two distinct sets of digital samples with the same timing delay may be averaged together to reduce noise. This noise reduction can continue to improve as additional sets of digital samples are obtained during operation of the LIDAR system 100.

The receiver circuit 170 includes one or more circuits that form a signal chain for detecting and processing a LIDAR signal that is reflected from a target region. In an example, the receiver circuit 170 includes a detector circuit 180, a sampling circuit 190, and a filter circuit 197. The detector is configured to receive a reflected LIDAR pulse and provide an electrical signal that is indicative of the received LIDAR pulse to the sampling circuit 185. The sampling circuit 185 is configured to process, such as through operation of the conditioning circuit 190 and the converter circuit 195, the electrical signal that is indicative of the received LIDAR pulse to generate a digitized representation of the electrical signal. The filter 197 includes one or more circuits that is configured to process the digitized representation of the electrical signal, such as to reduce or remove noise.

The signal detector 175 includes a circuit that is configured to use the signals or waveforms that are generated or produced by the reference circuit 120 and the receiver circuit 170 to identify a reflected LIDAR pulse. In an example, identifying the reflected LIDAR pulse includes determining a time-based location of the pulse or a location of a peak of the pulse in a signal produced by the receiver circuit 170. In another example, identifying the reflected LIDAR pulse includes obtaining or determining an amplitude plot or temporal profile of the reflected LIDAR pulse in a signal produced by the receiver circuit 170. The signal detector 175, for example, includes a matched filter that is configured to use the reference waveform generated by the reference circuit 120 as a reference or template signal for identifying the LIDAR pulse in the digitized received signal produced by the receiver circuit 170. In the case that a matched filter is used in signal detector 175, the noise reduction filters 165, 197, or both may be a component or element of the matched filter.

In operation, the illuminator 110 generates a set of one or more LIDAR pulses which are each split by the beam splitter 115 to form a transmit pulse 116 and a reference pulse 117. In some examples, rather than using the beam splitter 115, the reference pulse 117 is obtained from light of a LIDAR pulse that is scattered of one or more components of the LIDAR system. The transmit pulse 116 is transmitted, such as through an optical lens, to a target region, while the reference pulse 117 is routed to the detector 125. In an example, a portion of a transmit pulse 116 is reflected from the target region and detected the detector 180 in the received signal 176. In an example, the reflected portion of the transmitted pulse 116 is only present in the received signal 176, and therefore only detectable by the detector 180, when the target region in within a detectable range of the LIDAR system 100 or when the target region reflects that transmitted pulse at a suitable angle relative to the LIDAR system. The reference pulse 117, however, remains in the LIDAR system 100 and is therefore is always detectable by the detector 125, improving the quality of the reference waveform even when the return signal 176 is weak, noisy, or non-existent. The sampling circuit 130 samples each detected reference pulse at one or more points along the pulse waveform to generate a set of digitized samples that is indicative of points on a waveform corresponding to the detected reference pulse.

In an example, the transmitter 105 generates a LIDAR pulse according to a system trigger signal, such as a reference clock. The sampling circuit 130 can initiate a sampling sequence according to a sampling trigger signal that is offset from the system trigger signal, such as by a fraction of the sampling period of the sampling circuit. The offset can be adjusted to enable the sampling circuit 130 to sample two or more reference pulses at different offsets and to generate two or more sets of corresponding digitized samples, where each set of digital samples corresponds to samples of a different reference pulse. In an example, the samples are obtained at the highest sampling rate of the sampling circuit. The reference waveform generator 145 can then combine or use the two or more sets of digitized samples to generate a synthesized waveform that has a higher temporal resolution than the sampling rate of the sampling circuit 130. In an example, two or more synthesized waveforms can be generated over time and used by the filter 165 to remove noise or to perform other processing. The synthesized waveforms can then be used to detect, such as in convolution operation implemented by a matched filter circuit, a reflected portion of the transmitted pulse 116 in the received signal 176.

FIGS. 2A-2D illustrate diagrams of electrical pulses that are sampled to generate a synthesized reference waveform or signal, such as described in the discussion of FIG. 1. In an example, each electrical pulse that is illustrated in FIGS. 2A-2D is an example of a distinct reference pulse, such as the reference 117, generated by the transmitter 105 and detected by the detector 125. In an example, the electrical pulses are transmitted by the transmitter over a span of time during the operation a LIDAR system, such as the system 100. Each pulse can be sampled at an indicated offset relative to a reference trigger 210 (e.g., a system trigger signal).

FIG. 2A illustrates a first electrical pulse 205 and a set of digital samples 215, 220 and 225 of the first electrical pulse obtained at sampling interval $T_S$. The sampling interval $T_S$ can be indicative of the minimum sampling time or interval of the sampling circuit that generates the digital samples. As shown in FIG. 2A, a first sample 215 is captured at an interval of time (hereinafter, "interval") $T_S$ after the reference trigger 210 and each subsequent sample 220 and 225 is captured at an interval of at least $T_S$ after the capture of the immediately preceding sample. In one example, the first sample is coincident with or minimally delayed from the reference trigger.

FIG. 2B illustrates a second electrical pulse 230 and a set of digital samples 235, 240 and 245 of the second electrical pulse. As shown in FIG. 2B, a second sample 235 is captured (e.g., sampling is initiated or a first sample is captured) at a time $T_S+\Delta T$ after the reference trigger 210 and each subsequent sample 240 and 245 is captured at an interval of at least $T_S$ after the capture of the immediately preceding sample. The time+$\Delta T$ is an offset or delay for triggering a sampling sequence relative to reference trigger 210. In an example, the offset is a fraction of the sampling interval $T_S$. The offset+$\Delta T$ delays sampling sequence such that the first sample 235 is obtained, relative to the reference trigger 210, at a $T_S+\Delta T$, the second sample 240 is obtained at 2 $T_S+\Delta T$, and the third sample 245 is obtained at 3 $T_S+\Delta T$.

FIG. 2C illustrates a third electrical pulse 250 and a set of digital samples 255, 260 and 265 of the third electrical pulse. As shown in FIG. 2C, a third sample 235 is captured at a time $T_S+2\Delta T$ after the reference trigger 210 and each subsequent sample 260 and 265 is captured at an interval or at least $T_S$ after the capture of the immediately preceding sample. The time+$2\Delta T$ is an offset or delay for triggering a sampling sequence relative to reference trigger 210. In an example, the offset+$2\Delta T$ is twice the duration of the offset discussed in FIG. 2B. In another example, the offset+$2\Delta T$ is a larger or smaller offset than the offset discussed in FIG. 2B. The offset+$2\Delta T$ delays sampling sequence such that the first sample 255 is obtained, relative to the reference trigger 210, at a $T_S+2\Delta T$, the second sample 260 is obtained at 2 $T_S+2\Delta T$, and the third sample 265 is obtained at 3 $T_S+2\Delta T$.

FIG. 2D illustrates an aggregation of the samples described in FIGS. 2A-2C. In an example, the aggregated samples have temporal resolution of $\Delta T$. The aggregated samples can be used, such as by the reference waveform generator 145, to generate a synthesized reference waveform, as described herein.

Figure 3:
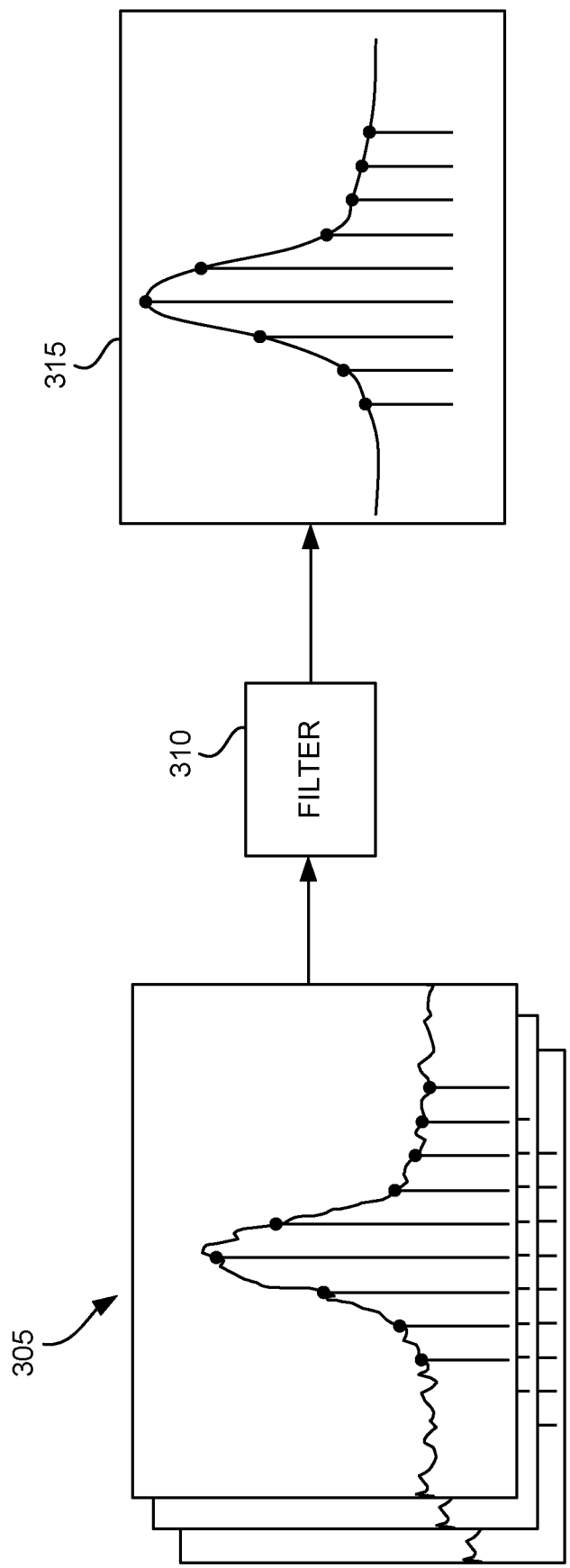
FIG. 3 illustrates an example of filtering a generated reference waveform.

FIG. 3 illustrates an example of filtering a synthesized reference waveform. As shown in FIG. 3, two or more reference waveforms 305 can be processed by a filter 310 to generate a filtered reference waveform 315. The filter 310 is an example of the filter 165 (FIG. 1). In an example, the two or more synthesized reference waveforms 305 are generated by the reference waveform generator 145. The filter 310 can be an example of the filter 156 and can be configured to generate the filtered reference waveform 315 by averaging the two or more reference waveforms 305 or by using any other suitable filtering technique. In an example, a time constant of the averaging can be selected or adapted to obtain a specified level of noise reduction while maintaining the ability of the reference waveform the track dynamic changes, such as temperature, power supply variation that may affect the shape of the reference waveform. A larger time constant of averaging can result in greater noise reduction while reducing the ability of the reference waveform to track dynamic changes. A shorter time constant of averaging can result in a greater ability to track dynamic changes at the cost for reduced noise reduction.

Figure 4:
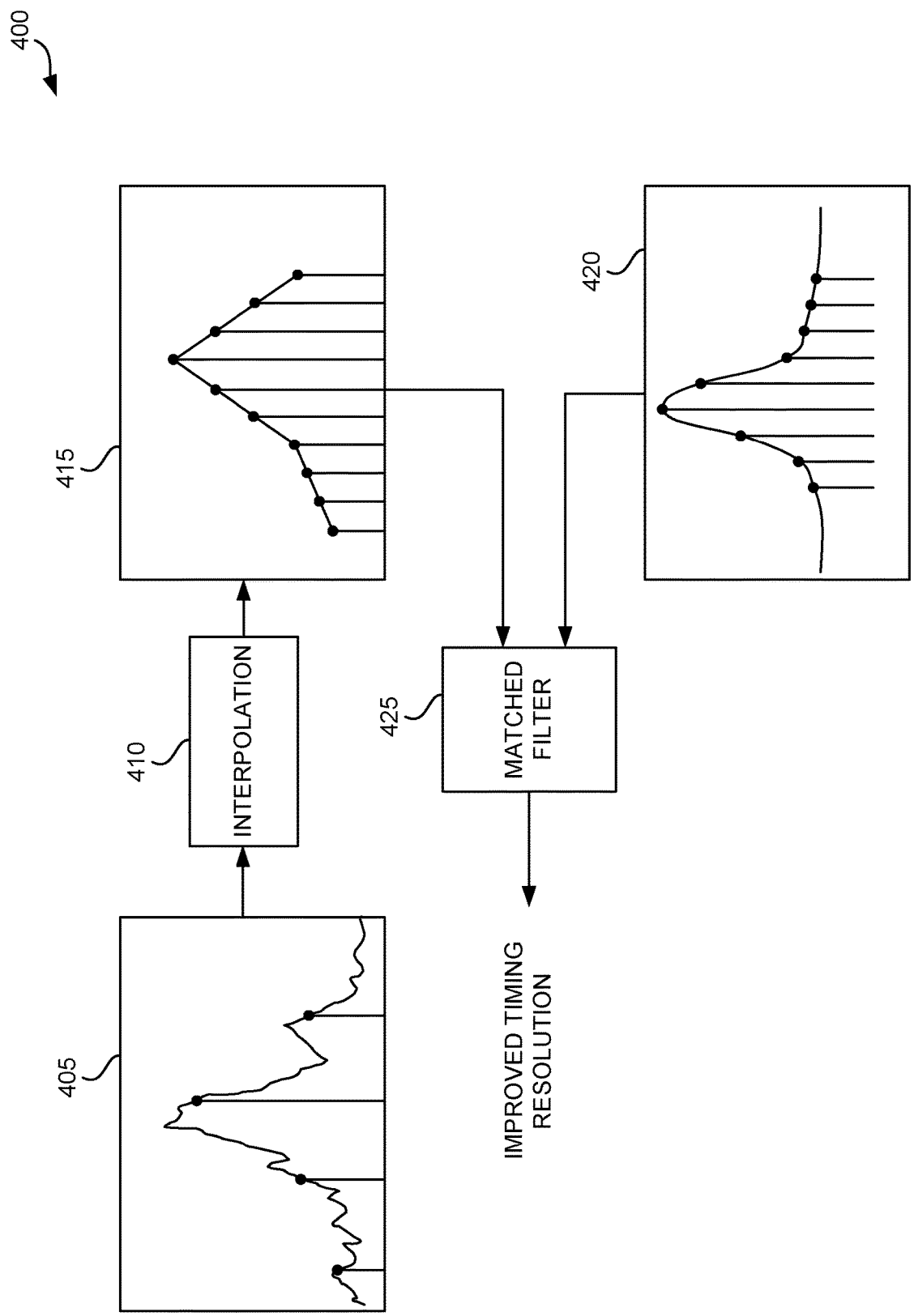
FIG. 4 illustrates an example of processing a reflected signal using a generated reference waveform.

FIG. 4 illustrates an example of processing a reflected signal using a synthesized reference waveform. A signal chain, such as the receiver circuit 170 can obtain a set of digital samples 405 of a reflected signal, such as by performing low temporal resolution measurements of the reflected signal using a low sample rate sampling circuit, such as sampling circuit 130. An interpolation circuit 410 can process the set of digital samples 405, such as by using polynomial interpolation or another data interpolation technique, to generate an enhanced set of digital samples 415. The enhanced set of digital samples 415 can include the digital samples 405 and a set of estimated digital samples that are determined from the digital samples 405. In an example, the interpolation circuit 410 uses digital up-sampling and interpolation to cause the number of samples in the enhanced set of digital samples 415 to match the sample rate of a synthesized reference waveform 420. The synthesized reference waveform 420 can include a high sample rate reference waveform, such as the generated by the reference circuit 120. The matched filter 425 can then process the process the enhanced set of digital samples 415 using the reference waveform 420, such as to determine the location or the arrival time of a LIDAR pulse in the reflected signal. According to these techniques, the location or time of the LIDAR pulse in the reference signal can be determined with an accuracy that is comparable to the temporal resolution or sample rate of the synthesized reference waveform.

Figure 5:
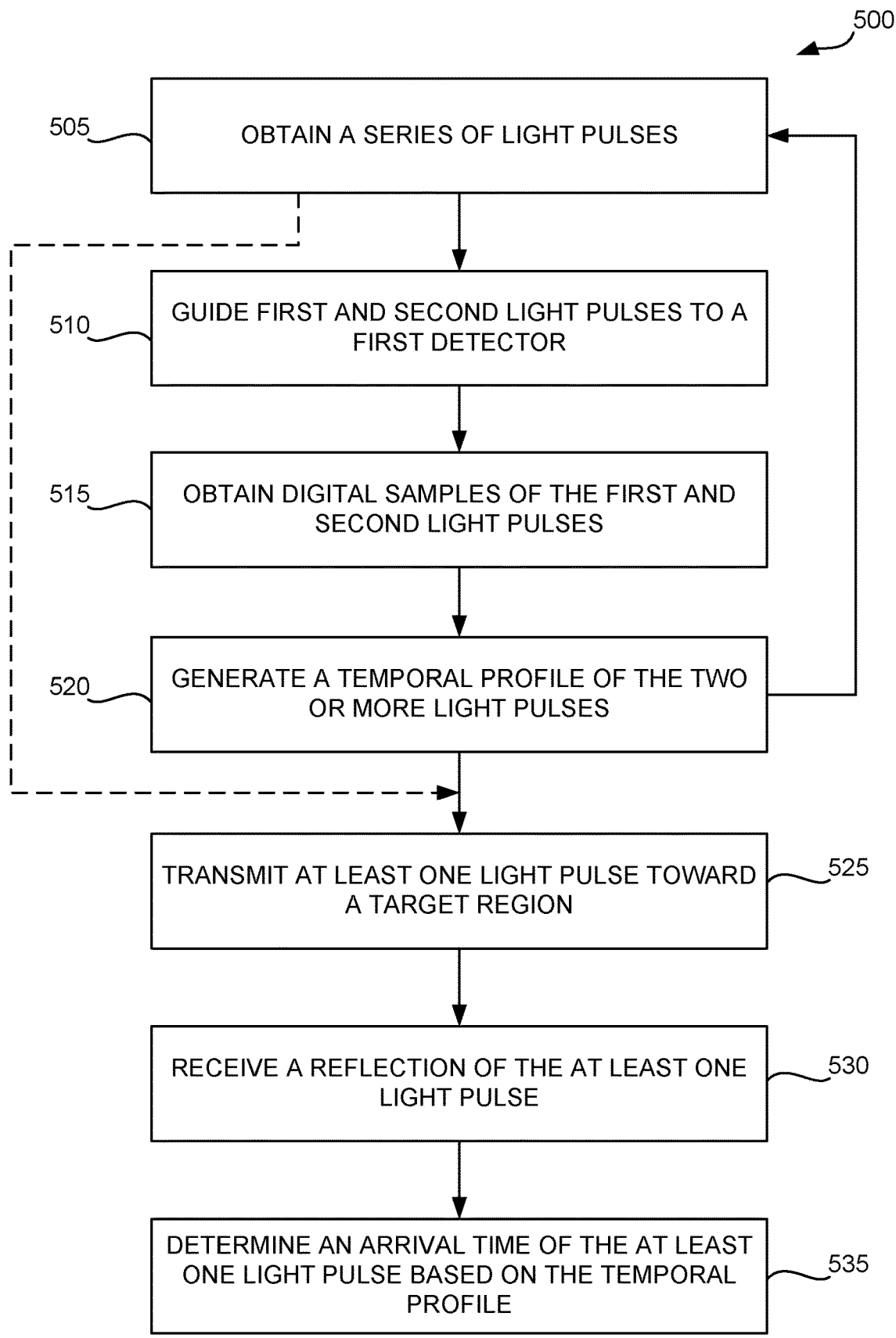
FIG. 5 illustrates an example of a method of operation of a LIDAR system.

FIG. 5 illustrates an example of operations 500 for operating a LIDAR system. In an example, the operations 500 are implemented or executed by system that is configured with one or more components of the LIDAR system 100, such as for improving the timing or distance measurement resolution of a LIDAR system according the techniques described herein.

At 505, a set of one or more light pulses are obtained, such as from an optical pulse emanator or transmitter circuit, such as the transmitter 105. In an example, obtaining the set of light pulses includes actuating an illuminator, such as the illuminator 110, to emit one or more light pulses and processing the emitted light pulses through an optical device, such as the splitter 115, to split or divide each light pulse into first light pulses 116 and second light pulses 117.

At 510, a first set of one or more light pulses are transmitted to, such as by using mirror or other optical reflector or optical wave guide or by geometrical optical design, and received by an optical pulse detector circuit (hereinafter, "detector circuit"), such as detector 125. The detector circuit generates an electrical signal that are indicative of the first set of light pulses. In an example, the electrical signal is indicative of the time varying intensity of each pulse in the first set of light pulses. The first set of light pulses are transmitted to, and received by, the detector independent of whether the LIDAR system transmits light pulses to, or receive reflections of light pulses from, the target region. The electrical signal generated by the detector circuit is then provided to a digital sampling circuit, such as the sampling circuit 130.

At 515, the electrical signal generated by the detector circuit is sampled by the digital sampling circuit. In an example, a first portion electrical signal that is indicative of a first light pulse is sampled by the digital sampling circuit to obtain a first set of one or more digital samples. The digital sampling may be triggered by a reference signal generated by the LIDAR system. The reference signal can include a clock signal that is synchronized to, or associated with, the generation or transmission of the two or more light pulses obtained at 505. In another example, a second portion of the electrical signal that is indicative of a second light pulse is received at the digital sampling circuit and sampled at an adjusted sample time to obtain a second set of one or more digital samples where each sample of the second set of digital samples is offset from a corresponding sample in the first set of digital samples by a time delay. Sampling at the adjusted sample timing can include adjusting the reference signal, or another timing signal configured to actuate the digital sampling circuit, introduce time delay that either advances or delays triggering or actuating the digital sampling circuit to obtain the second set of digital samples. Sampling at the adjusted sample timing can include any other technique for shifting or offsetting (e.g., delaying or advancing) the trigger or sample time for obtaining the second set of digital samples relative to the trigger or sample time for obtaining the first set of digital samples. The sampling time of each portion of the electrical signal that corresponds to a different light pulse can be adjusted by a different time delay within a specified span or period of time, such as within a sampling period of a sampling circuit having a first sample rate, as described herein so as to cause the digital sampling circuit to sample portion of the electrical signal at a different time relative to a reference signal or relative to the sample time of at least one other portion of the electrical signal.

At 520, the first and second set of one or more digital samples are used to obtain a temporal profile, or a reference waveform that is indicative of the temporal profile, of the light pulses obtained at 505. The temporal profile includes an estimate of the shape, both temporal and amplitude, of the obtained light pulses. In an example, generating the temporal profile includes generating a first temporal profile using the first set of digital samples and updating the first temporal profile using the second set of digital samples to obtain a second temporal profile. Generating the first temporal profile can include storing the digital samples in an electronic memory that is associated with, or accessible by, a process that is configured to retrieve the samples according to a time index or parameter. Updating the first temporal profile, in an example, includes storing the second set of digital samples in the electronic memory such that the process can retrieve samples from the first and second set of digital samples according to a time index or parameter such that consecutive time indexes or parameters values index or obtains interleaved samples from the electronic memory. In another example, updating the first temporal profile includes combining the first set of digital samples with the second set of digital samples using one or more mathematical or logical operations, such as averaging, and using the combined samples to generate the second temporal profile according to any of the techniques described herein. In yet another example, updating the first temporal profile includes generating an interim temporal profile using the second set of digital samples and combining the interim temporal profile with the first temporal profile to obtain the second temporal profile.

In an example, the first and second sets of digital samples are combined in a time indexed array or other data structure according the time delay associated with each set of samples. The combined samples are then processed using suitable digital signal processing techniques to generate a temporal profile of the light pulses obtained at 505. Such processing can include one or more filtering, up-sampling, interpolation techniques or operations. In an example, the generated temporal profile includes a data structure, such as a time indexed table or array, comprising one or more sampled, interpolated, or filtered data points that are indicative of the time varying amplitude or signal intensity of the of the light pulses obtained at 505. The generated temporal profile, in an example, has a higher resolution than the sample rate or sampling resolution of the detector used to capture the first and second light pulses.

At 525, at least one light pulse is transmitted, such as by the transmitter 105, towards a target region. The at least one light pulse can be transmitted towards one or more spatial points in the target region such that one or more light pulses scan the target region according to a two-dimensional pattern at a specified spatial resolution. In an example, transmitting the at least one includes obtaining the light pulse from an illuminator, such as the illuminator 110, processing the obtained light pulse through an optical device, such as the splitter 115, to split or divide the light pulse into first and second light pulses, and transmitting the first light pulse (e.g., reference pulse 117) to a light detector, such as the detector 125, while transmitting the second light pulse (e.g., transmitted pulse 116) towards the target region, such as a through a lens configured to emit light pulses generated by the LIDAR system. In another example, transmitting the at least one includes obtaining the light pulse from an illuminator and transmitting the unmodified light pulse towards the target region through the lens.

At 530, a reflection of the at least one light pulse that is transmitted at 525 is received from the target region at a second detector circuit, such as the detector 180. Receiving the reflection of the at least one light pulse can include actuating the sampling circuit, such as the sampling circuit 185, to capture one or more digital samples of the amplitude or intensity of the reflected light pulse at a second sample rate. In an example, the sampling circuit that obtains digital samples of the reflection of the at least one light pulse has a higher sample rate (e.g., the second sample rate) that is higher than the sample rate (e.g., the first sample rate) of the sampling circuit that obtains digital samples of the light pulses received at 510. In another example, the sampling circuit that obtains digital samples of the reflection of the at least one light pulse has a sample rate that is equivalent, similar, or approximately equal, to the temporal resolution of the temporal profile generated at 520. In yet another example, the sampling circuit that obtains digital samples of the reflection of the at least one light pulse has a sample rate that is lower than the temporal resolution of the temporal profile generated at 520.

At 535, the arrival time of the reflection of the at least one light pulse is determined based on the temporal profile of the generated at 520. In an example, the arrival time of the at least one light pulse is determined by adjusting one or more coefficients of a filter circuit, such as a matched filter circuit, based on the temporal profile and processing the digital samples of the reflection of the at least one light pulse using the adjusted filter circuit to determine, for example, the time at which there is a maximum overlap between the digital samples and the temporal profile. In an example, adjusting the coefficients of the filter circuit includes using one or more sampled, interpolated, or filtered data points obtained from the temporal profile to determine the coefficients of the filter circuit.

The set of operations 500 can include any other operations, or any other suitable order of the described operations, that is suitable for implementing the techniques described herein. In an example, the set of operations 500 includes receiving a first pulse and a second pulse at the first detector as described at 510, adjusting the sampling time or trigger for initiating sample of each pulse to introduce a different time delay between sets of digital samples obtained from each pulse, determining a temporal profile or an intermediate reference waveform based each set of digital samples, and combining each temporal profile or intermediate reference waveform, such as by averaging the temporal profiles or intermediate reference waveforms, to generate a combined temporal profile or reference waveform, and using the combined temporal profile or reference waveform in the matched filter described herein. In another example, the set of operations 500 includes sampling the first and second light pulses as described at 515 at a lower sample rate than the sample rate at which the reflection of the at least one light pulse is sampled at 530. In another example, the set of operations 500 includes up-sampling, prior to determining the arrival time at 530, the set of digital samples of the reflection of the at least one light pulse based on, or to match, the resolution of the temporal profile generated at 520.

One or more operation of the set of operations 500 can be executed in a different order than described herein. In an example, one or more of operations 510, 515, and 520 can be executed in prior to, subsequent to, or in parallel with, one or more of the operations 525, 530, and 535. In an example, the temporal is generated or updated in parallel with the transmission of the at least one light pulse to, or the receipt of the reflection of the at least one light pulse from, the target region. In another example, the temporal profile is continuously updated by obtaining and processing additional light pulses as described in operations 505, 510, 515 and 510.

Various Examples

Example 1 is a method for determining, in an optical detection system, a distance to a target region, the method comprising: obtaining first and second light pulses from an optical transmitter; providing, to a first detector within the optical detection system, the first and second light pulses; adjusting a sample time of the second light pulse to create a time delay between capturing a sample of the first light pulse and capturing a sample of the second light pulse at the first detector; capturing samples of the respective first and second light pulses at the first detector based upon the adjusted sample time; obtaining a temporal profile of the captured samples; transmitting a third light pulse to the target region; and receiving, at a second detector, a reflection from the target region of the transmitted third pulse and determining an arrival time of the received reflection based on the temporal profile.

In Example 2, the subject matter of Example 1 includes, wherein the third light pulse and at least one of the first and second light pulses are obtained from a common light pulse.

In Example 3, the subject matter of Example 2 includes, obtaining the third light pulse and at least one of the first and second light pulses by transmitting the common light pulse through an optical beam splitter to partition the common light pulse into the third light pulse and at least one of the first and second light pulses.

In Example 4, the subject matter of Examples 1-3 includes, wherein adjusting the sample time of the second light pulse to create the time delay between capturing the sample of the first light pulse and capturing the sample of the second light pulse at the first detector comprises adding a time delay to a sampling clock of a converter circuit that is configured to capture digital samples of a light pulse received at the first detector.

In Example 5, the subject matter of Examples 1-4 includes, wherein adjusting the sample time of the second light pulse to create the time delay between capturing the sample of the first light pulse and capturing the sample of the second light pulse at the first detector comprises introducing a time delay to the arrival time of the second light pulse at a converter circuit that is configured to capture digital samples of a light pulse received at the first detector.

In Example 6, the subject matter of Examples 1-5 includes, wherein capturing the respective first and second light pulses at the first detector based upon the adjusted sample time comprises capturing a first set of one or more samples of the first light pulse at a sample time of the first light pulse and capturing a second set of one or more samples of the second light pulse at the adjusted sample time of the second light pulse, wherein the adjusted sample time of the second light pulse is delayed with respect to the sample time of the first light pulse by the time delay.

In Example 7, the subject matter of Example 6 includes, wherein first detector has a first sample rate, and obtaining the temporal profile of the captured samples comprises interleaving the first set of one or more samples with the second set of one or more samples to obtain a temporal profile having a higher temporal resolution than the first sample rate.

In Example 8, the subject matter of Examples 1-7 includes, wherein the time delay between capturing the sample of the first light pulse and capturing the sample of the second light pulse at the first detector is smaller than a sampling period of the first detector.

In Example 9, the subject matter of Examples 1-8 includes, up-sampling samples of the received reflection from the target region of the transmitted third pulse based on the temporal profile of the captured samples prior to determining an arrival time arrival time of the received reflection based on the temporal profile.

In Example 10, the subject matter of Examples 1-9 includes, adjusting a coefficient of a matched filter based on the determined temporal profile of the captured samples; and determining the arrival time of the received reflection from the target region of the transmitted third pulse using the matched filter.

In Example 11, the subject matter of Examples 1-10 includes, wherein the temporal profile of the captured samples comprises an estimate of a shape of the first and second light pulses.

Example 12 is an optical range finding system to determine a distance to a target region, the system comprising: a transmitter circuit to generate first and second light pulses; a first optical detector circuit to convert the first and second light pulses to respective first and second electrical signals; a sampling circuit, coupled to the first optical detector, to obtain samples of an electrical signal; a modulation circuit, coupled to the sampling circuit, to actuate the sampling circuit to obtain first samples of the first electrical signal according to a first sampling trigger and to obtain second samples of the second electrical signal according to a second sampling trigger, wherein the first sampling trigger is temporally offset from the second sampling trigger by a timing delay corresponding to a fraction of a sampling period of the first detector; a synthesizer circuit to obtain a reference waveform having a higher resolution than a sampling resolution of the first detector circuit by interleaving the first and second samples to generate the reference waveform; and a signal detector circuit to determine an arrival time of a reflection from the target region of a third light pulse based on the reference waveform.

In Example 13, the subject matter of Example 12 includes, wherein the transmitter circuit includes one or more circuits to transmit the third light pulse to the target region, and the system further comprises a second detector circuit to convert the reflection of third light pulse to a third electrical signal.

In Example 14, the subject matter of Examples 12-13 includes, wherein the system further comprises a light splitter to obtain the third light pulse and at least one of the first and second light pulses from a common light pulse.

In Example 15, the subject matter of Examples 12-14 includes, wherein the system further comprises a delay circuit, coupled to the sampling circuit, to obtain the time delay between the first sampling trigger and the second sampling trigger.

In Example 16, the subject matter of Examples 12-15 includes, wherein the synthesize circuit comprises an averaging circuit to obtain the reference waveform by averaging the respective first and second samples.

In Example 17, the subject matter of Examples 12-16 includes, wherein the signal detector circuit comprises: a second optical detector circuit to receive the reflection from the target region of a third light pulse; a filter circuit coupled to the second detector circuit and to the synthesizer circuit; a second circuit to obtain an adjusted filter circuit by adjusting one or more components of the filter circuit based on the reference waveform and to use the adjusted filter to determine the arrival time of the reflection of the third light pulse.

Example 18 is a method for determining, in an optical detection system, a distance to a target region, the method comprising: obtaining first and second light pulses from a signal generator within the optical detection system; obtaining samples of the respective first and second light pulses, the samples having a first temporal resolution; generating a reference waveform having a second temporal resolution by combining the samples of the respective first and second light pulses, the second temporal resolution being higher than the first temporal resolution; obtaining a reflection of a third light pulse from the target region: and determining an arrival time of the reflection of the third light pulse using the reference waveform.

In Example 19, the subject matter of Example 18 includes, capturing a first set of one or more samples of the first light pulse at a sample time of the first light pulse; and capturing a second set of one or more samples of the second light pulse at the adjusted sample time of the second light pulse, wherein the adjusted sample time of the second light pulse is delayed with respect to the sample time of the first light pulse by the time delay that is smaller than a sampling period of the a detector circuit that is configured to obtain the samples of the respective first and second light pulses.

In Example 20, the subject matter of Examples 18-19 includes, wherein combining the combining the samples of the respective first and second light pulses comprises interleaving the samples of the respective first and second light pulses to obtain the reference waveform having the second temporal resolution.

In Example 21, the subject matter of Examples 18-20 includes, wherein determining the arrival time of the reflection of the third light pulse using the reference waveform comprises: obtaining a matched filter based on the reference waveform; and processing samples of the reflection of the third light pulse using the matched filter to determine an overlap between the matched filter and the samples of the reflection of the third light pulse.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

Each of the non-limiting aspects above can stand on its own, or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Additionally, the term "can" or "can include" is used permissively to indicate that in some examples, a component includes an associated element or in other examples, a component optionally includes or omits the element. Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for determining, in an optical detection system, a distance to a target region, the method comprising:
    obtaining first and second light pulses from an optical transmitter;
    providing, to a first detector within the optical detection system, the first and second light pulses;
    adjusting a sample time of the second light pulse to create a time delay between capturing a sample of the first light pulse and capturing a sample of the second light pulse at the first detector, including adding a time delay to a sampling clock of a converter circuit that is configured to capture digital samples of a light pulse received at the first detector;
    capturing samples of the respective first and second light pulses at the first detector based upon the adjusted sample time;
    obtaining a temporal profile of the captured samples;
    transmitting a third light pulse to the target region; and
    receiving, at a second detector, a reflection from the target region of the transmitted third pulse and determining an arrival time of the received reflection based on the temporal profile.

2. The method of claim 1, wherein the third light pulse and at least one of the first and second light pulses are obtained from a common light pulse.

3. The method of claim 2, further comprising obtaining the third light pulse and at least one of the first and second light pulses by transmitting the common light pulse through an optical beam splitter to partition the common light pulse into the third light pulse and at least one of the first and second light pulses.

4. The method of claim 1, wherein adjusting the sample time of the second light pulse to create the time delay between capturing the sample of the first light pulse and capturing the sample of the second light pulse at the first detector comprises introducing a time delay to the arrival time of the second light pulse at a converter circuit that is configured to capture digital samples of a light pulse received at the first detector.

5. The method of claim 1, wherein capturing the respective first and second light pulses at the first detector based upon the adjusted sample time comprises capturing a first set of one or more samples of the first light pulse at a sample time of the first light pulse and capturing a second set of one or more samples of the second light pulse at the adjusted sample time of the second light pulse, wherein the adjusted sample time of the second light pulse is delayed with respect to the sample time of the first light pulse by the time delay.

6. The method of claim 5, wherein first detector has a first sample rate, and obtaining the temporal profile of the captured samples comprises interleaving the first set of one or more samples with the second set of one or more samples to obtain a temporal profile having a higher temporal resolution than the first sample rate.

7. The method of claim 1, wherein the time delay between capturing the sample of the first light pulse and capturing the sample of the second light pulse at the first detector is smaller than a sampling period of the first detector.

8. The method of claim 1, further comprising up-sampling samples of the received reflection from the target region of the transmitted third pulse based on the temporal profile of the captured samples prior to determining an arrival time arrival time of the received reflection based on the temporal profile.

9. The method of claim 1, further comprising:
    adjusting a coefficient of a matched filter based on the determined temporal profile of the captured samples; and
    determining the arrival time of the received reflection from the target region of the transmitted third pulse using the matched filter.

10. The method of claim 1, wherein the temporal profile of the captured samples comprises an estimate of a shape of the first and second light pulses.

11. An optical range finding system to determine a distance to a target region, the system comprising:
    a transmitter circuit to generate first and second light pulses;
    a first optical detector circuit to convert the first and second light pulses to respective first and second electrical signals;
    a sampling circuit, coupled to the first optical detector, to obtain samples of an electrical signal;
    a modulation circuit, coupled to the sampling circuit, to actuate the sampling circuit to obtain first samples of the first electrical signal according to a first sampling trigger and to obtain second samples of the second electrical signal according to a second sampling trigger, wherein the first sampling trigger is temporally offset from the second sampling trigger by a timing delay corresponding to a fraction of a sampling period of the first detector;
    a synthesizer circuit to obtain a reference waveform having a higher resolution than a sampling resolution of the first detector circuit by interleaving the first and second samples to generate the reference waveform; and
    a signal detector circuit to determine an arrival time of a reflection from the target region of a third light pulse based on the reference waveform.

12. The system of claim 11, wherein the transmitter circuit includes one or more circuits to transmit the third light pulse to the target region, and the system further comprises a second detector circuit to convert the reflection of third light pulse to a third electrical signal.

13. The system of claim 11, wherein the system further comprises a light splitter to obtain the third light pulse and at least one of the first and second light pulses from a common light pulse.

14. The system of claim 11, wherein the system further comprises a delay circuit, coupled to the sampling circuit, to obtain the time delay between the first sampling trigger and the second sampling trigger.

15. The system of claim 11, wherein the synthesize circuit comprises an averaging circuit to obtain the reference waveform by averaging the respective first and second samples.

16. The system of claim 11, wherein the signal detector circuit comprises:
a second optical detector circuit to receive the reflection from the target region of a third light pulse;
a filter circuit coupled to the second detector circuit and to the synthesizer circuit; and
a second circuit to obtain an adjusted filter circuit by adjusting one or more components of the filter circuit based on the reference waveform and to use the adjusted filter to determine the arrival time of the reflection of the third light pulse.

17. A method for determining, in an optical detection system, a distance to a target region, the method comprising:
obtaining first and second light pulses from a signal generator within the optical detection system;
obtaining samples of the respective first and second light pulses, the samples having a first temporal resolution;
generating a reference waveform having a second temporal resolution by combining the samples of the respective first and second light pulses, the second temporal resolution being higher than the first temporal resolution;
obtaining a reflection of a third light pulse from the target region; and
determining an arrival time of the reflection of the third light pulse using the reference waveform.

18. The method of claim 17, further comprising:
capturing a first set of one or more samples of the first light pulse at a sample time of the first light pulse; and
capturing a second set of one or more samples of the second light pulse at an adjusted sample time of the second light pulse, wherein the adjusted sample time of the second light pulse is delayed with respect to the sample time of the first light pulse by the time delay that is smaller than a sampling period of a detector circuit that is configured to obtain the samples of the respective first and second light pulses.

19. The method of claim 17, wherein combining the combining the samples of the respective first and second light pulses comprises interleaving the samples of the respective first and second light pulses to obtain the reference waveform having the second temporal resolution.

20. The method of claim 17, wherein determining the arrival time of the reflection of the third light pulse using the reference waveform comprises:
obtaining a matched filter based on the reference waveform; and
processing samples of the reflection of the third light pulse using the matched filter to determine an overlap between the matched filter and the samples of the reflection of the third light pulse.

21. A method for determining, in an optical detection system, a distance to a target region, the method comprising:
obtaining first and second light pulses from an optical transmitter;
providing, to a first detector within the optical detection system, the first and second light pulses;
adjusting a sample time of the second light pulse to create a time delay between capturing a sample of the first light pulse and capturing a sample of the second light pulse at the first detector;
capturing a first set of one or more samples of the first light pulse at a sample time of the first light pulse and capturing a second set of one or more samples of the second light pulse at the adjusted sample time of the second light pulse, wherein the adjusted sample time of the second light pulse is delayed with respect to the sample time of the first light pulse by the time delay;
obtaining a temporal profile of the captured samples;
transmitting a third light pulse to the target region; and
receiving, at a second detector, a reflection from the target region of the transmitted third pulse and determining an arrival time of the received reflection based on the temporal profile.

22. The method of claim 21, wherein first detector has a first sample rate, and obtaining the temporal profile of the captured samples comprises interleaving the first set of one or more samples with the second set of one or more samples to obtain a temporal profile having a higher temporal resolution than the first sample rate.

23. The method of claim 21, wherein the third light pulse and at least one of the first and second light pulses are obtained from a common light pulse.

24. The method of claim 23, further comprising obtaining the third light pulse and at least one of the first and second light pulses by transmitting the common light pulse through an optical beam splitter to partition the common light pulse into the third light pulse and at least one of the first and second light pulses.

* * * * *